July 24, 1962   P. DIETIKER   3,046,406

AUTOMATIC GAS VALVE

Filed May 27, 1960

INVENTOR.
PAUL DIETIKER
BY
*Alan M. Staubly*
ATTORNEY

United States Patent Office 3,046,406
Patented July 24, 1962

3,046,406
AUTOMATIC GAS VALVE
Paul Dietiker, Redondo Beach, Calif., assignor to Minneapolis-Honeywell Regulator Company, Minneapolis, Minn., a corporation of Delaware
Filed May 27, 1960, Ser. No. 32,293
1 Claim. (Cl. 250—215)

This invention relates to a self-contained automatic gas valve for controlling a gas light located exterior of a building. More particularly, the invention relates to a self-contained gas valve which automatically turns the gas on and off in response to the absence or presence of daylight, respectively. Still more particularly, the invention relates to an adapter unit which may be used to convert a manually controlled or constantly burning lawn gas light into an automatically controlled gas light which reduces the gas flow to the light at sunup and increases the gas flow at sundown.

One of the objects of the invention is to provide a self-contained control valve which may be used to provide the above mentioned control functions for an exterior gas light.

Another object of the invention is to provide a control unit which is adapted to convert a nonautomatic gas light into an automatically controlled gas light by a mere insertion of the control unit between the lamp of the gas light and its base.

A further object of the invention is to provide a gas valve which may be used to control exteriorly positioned gas lights in response to the presence or absence of daylight by means of a self-contained light sensing unit for operation of the valve directly, without the necessity of a supply of outside electrical power.

A still further object of the invention is to provide a gas-valve converting unit that is of simple construction that will not materially change the appearance of a gas light installation by the addition thereto to provide automatic control of the gas light.

Figure 1:
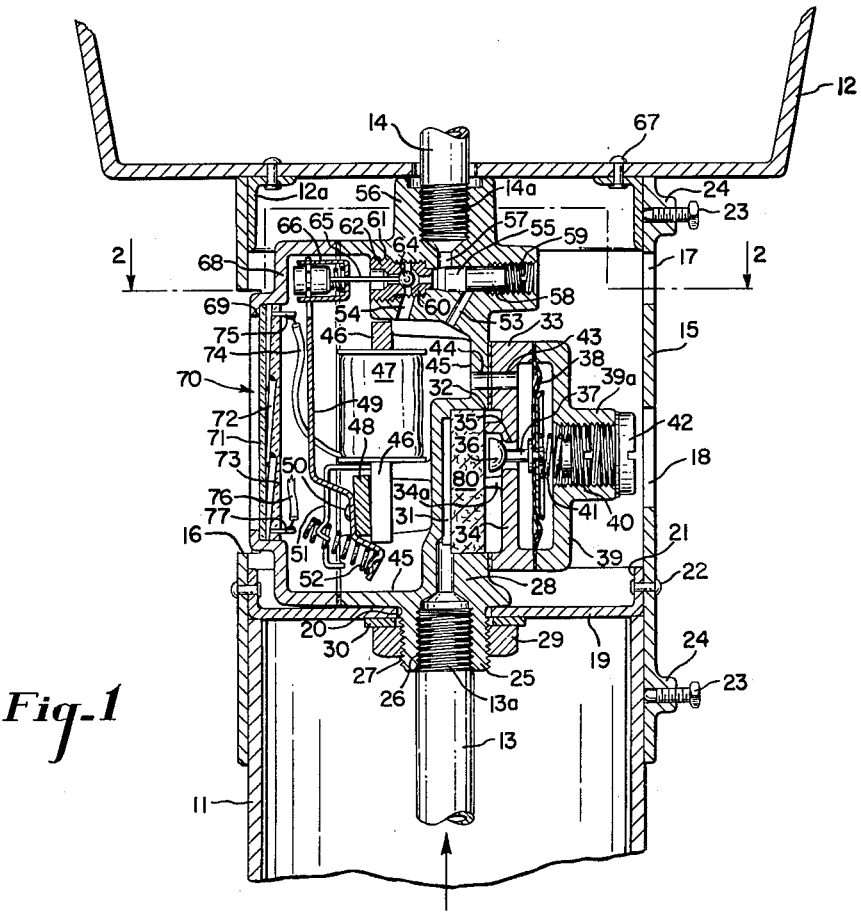
Figure 2:
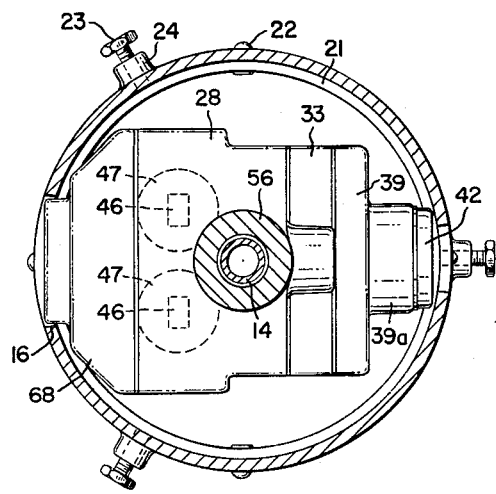

Still further objects of the invention will become apparent upon reading the following detailed description of the invention in conjunction with the accompanying drawing, wherein:

FIGURE 1 is a vertical sectional view through the control device and portions of the lamp and base of an outdoor gas light; and FIGURE 2 is a cross-sectional view taken along line 2—2 of FIGURE 1.

Referring to FIGURE 1, the reference numeral 11 designates the wall of the base of an outdoor or lawn type of gas light, while the reference numeral 12 designates the lamp portion of the gas light. A gas supply pipe 13 is illustrated as being threaded at its upper end 13a and is adapted to be connected to the threaded portion 14a at the lower end of a pipe 14 that connects to a burner head (not shown) located within the lamp head 12 by means of a sleeve coupling (not shown) or the control unit constituting this invention, which will now be described.

The reference numeral 15 designates a sleeve like housing having an opening 16 in one side thereof and two other openings 17 and 18 in the other side thereof. A plate 19, having a central aperture 20 therein and an annular flange 21 extending upwardly from the periphery thereof, is secured to the housing 15 by means of rivets 22 or other suitable means, to position the wall 19 upwardly from the lower end of the sleeve housing 15 a sufficient distance to provide a skirt portion below the plate that will snugly fit down over the outer wall of the base portion 11 of a gas light. Set screws 23, extending through bosses 24, formed on the housing 15 at circumferentially spaced intervals around the housing, provide means for locking the housing 15 to the base 11 of the light.

Extending through the aperture 20 in the plate 19 is an inlet boss 25 internally threaded at 26 and externally threaded at 27, of the gas valve body generally designated by the reference numeral 28. The body 28 is clamped to the plate 19 by means of a nut 29 threaded on the boss 25 against a washer 30 positioned between the nut and the lower surface of the plate 19.

The valve body 28 has a filter chamber 31 communicating with the inlet and an opening 32 in the side thereof which is closed by a casting 33 secured to the body 28 by bolts (not shown). A filter 80 is held in the filter chamber by means of a partition wall 34 having three bosses 34a thereon that project through the opening 32 and into engagement with the filter 80.

There is an aperture 35 that extends through the partition wall 34 coaxial with the bosses 34a to provide a valve seat for a pressure regulator valve 36.

The valve 36 is connected by a stem 37 extending therefrom through the opening 35 to a diagram 38. The diaphragm 38 is clamped to the outer peripheral edge of the casting 33 by means of a cover casting 39 by means of bolts (not shown). The cover 39 has an internally threaded stack 39a within which there is an adjustment screw 40. A coiled compression spring 41 extends between the adjustment screw 40 and the diaphragm 38. A closure cap 42 seals the outer opening of the stack. It will be noted that the opening 18 in the housing 15 is in alignment with the stack 39a to provide for removal of the closure plug 42 to provide adjustment of the screw 40. A bore 43 extends from the chamber formed between the partition wall 34 and the diaphragm 38 to an aligned bore 44 in the valve body 28, which, in turn, communicates with a stepped recess 45 forming an inlet chamber on the other side of the valve body from the pressure regulator.

Fixedly mounted in the chamber 45 is a U-shaped core member 46 having a coil 47 surrounding each of its legs. A bar-shaped armature 48 extends across and is pivoted on the forked ends of the core member 46 and has a lever 49 secured thereto by means of rivets 50. A bracket 51 has one of its ends suitably secured to the valve body and has its other end positioned near the pivoted end of the lever 49 so that a coil compression spring 52 positioned between the bracket 51 and a projection from the end of the lever 49 will normally bias the upper edge of the bar armature 48 away from the core member 46. Energization of the coils 47 is sufficient to overcome the bias of the spring 52 to attract the upper edge of the bar armature and pivot the lever 49 in a clockwise direction.

The recess 45 has two outlet passages 53 and 54, each of which communicates with an outlet chamber 55 which, in turn, communicates with an internally threaded outlet boss 56, formed on the upper end of the valve body, through a passage 57.

The passage 53 communicates directly with the passage 55 but is adapted to be closed or partially closed by a needle valve 58 screw-threaded into a threaded bore 59 communicating with the passage 55 and in alignment with the opening 17 in the housing 15.

The passage 54 communicates with the outlet chamber 55 indirectly through a control valve having a valve seat member 60 threaded into a stepped bore 61 terminating in the chamber 55. A guide sleeve 62 is also threaded into the threaded bore 61 and provides a guide and retainer for a ball valve 64 positioned to cooperate with the valve seat 60.

The ball valve 64 is connected by valve stem 65 to the upper free end of the lever 49 by a spring biased strain release connector 66. It will be noted that the ball valve 64 is normally biased out of seating engagement with the valve seat member 60 to normally provide gas flow from the chamber 45 past the ball valve to the outlet as well as through the passage 53 to the outlet.

The upper end of the housing 15 is also provided with annularly spaced set screws 23 for clamping the housing 15 to an annular collar 12a secured to the lamp head 12 by means of rivets 67 or other suitable means extending through the bottom of the lamp and through a flange on the collar.

The burner of the lamp head 12 may take the form of a jet or a mantle or any other suitable arrangement and is connected to the outlet boss 56 by means of the pipe 14 being screw threaded into the boss.

The chamber 45 is closed by means of the cup-shaped housing 68 that is secured to the valve body 28 by means of bolts (not shown). This housing 68 has an aperture 69 therein serving as a window for the admission of daylight. Mounted in the window or opening is a light sensing electric generator, generally designated by the reference numeral 70. It consists of a plate of glass 71, three commercial photoelectric cells 72 electrically connected in series and potting compound 73 for holding the glass and the photocells in the window and for sealing the opening 69 against gas leakage. A lead wire 74 extends from terminal 75, secured to one end photocell, to one of the coils 47 on the magnet core 46 while lead wire 76 extends from terminal 77, connected to the other end photocell, to the coil 47 on the other leg of the core 46. It is thus seen that all three photocells, which are electrically connected in series, form a closed electrical circuit with the two coils on the core member 46, which are also electrically connected in series, to provide power means for actuating the ball valve 64 to its closed position when there is daylight to energize the photocells 72, and to cause deenergization of the coils 47 when there is no daylight to permit the spring 52 to bias the valve 64 to its open position and to increase the gas flow to the light; it being presumed that the valve 58 is not completely closing the passage 53, to always permit a minimum flow of gas flow to the light to provide a constantly burning light. The intensity of the light may be varied by adjusting the position of the needle valve 58, the valve 64 being merely to increase the intensity of the light while it is dark and decrease the intensity during the daylight period.

It is thus seen that by making use of this invention, it is possible to convert, with a minimum of expense and work, a nonautomatically controlled outdoor gas lamp into a completely automatically controlled gas lamp without having to run an electric power line from the adjacent building out to the lamp and without having to disfigure the existing lamp or change its appearance, except to increase its height slightly.

As it is deemed to be obvious that modifications may be made of the invention without departing from the spirit thereof, it is to be understood that the scope of the invention is to be determined from the appended claim.

I claim as my invention:

The combination comprising a gas light having a base and a lamp, a valve body having an inlet and an outlet, an inlet chamber, an outlet chamber, a valve seat positioned between said chambers, a control valve between said chambers and cooperative with said seat and normally biased to an open position, an electric actuator for said control valve, said actuator being operably energizable by current generated by a photoelectric cell unit when sensing daylight to close said control valve, a photoelectric cell unit directly connected to said electric actuator, said valve body supporting and confining said control valve and photoelectric cell unit and adapted to be inserted in a gas line to said lamp, said valve body having a light admitting window adjacent said unit and a tubular housing of substantially the same cross sectional area as said base having means to connect one end thereof to said base and the other end to said lamp for supporting said lamp on said base, said housing having an opening aligned with said window for admitting light to said photoelectric cell unit.

References Cited in the file of this patent

UNITED STATES PATENTS

| | | |
|---|---|---|
| 965,545 | Sutton | July 26, 1910 |
| 1,155,496 | Lindblom | Oct. 5, 1915 |
| 2,743,871 | Heiser et al. | May 1, 1956 |
| 2,970,223 | Elmer | Jan. 31, 1961 |